(12) United States Patent
Chang et al.

(10) Patent No.: US 10,860,093 B1
(45) Date of Patent: Dec. 8, 2020

(54) EYE LOCATION TRACKING DEVICE INTEGRATED WITH HEAD-UP DISPLAY

(71) Applicant: GM GLOBAL TECHNOLOGY OPERATIONS LLC, Detroit, MI (US)

(72) Inventors: Kai-Han Chang, Madison Heights, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/553,475

(22) Filed: Aug. 28, 2019

(51) Int. Cl.
| | |
|---|---|
| *G06F 3/01* | (2006.01) |
| *G02B 27/01* | (2006.01) |
| *G01S 17/89* | (2020.01) |
| *G01S 17/66* | (2006.01) |
| *B60K 35/00* | (2006.01) |

(52) U.S. Cl.
CPC .............. *G06F 3/012* (2013.01); *B60K 35/00* (2013.01); *G01S 17/66* (2013.01); *G01S 17/89* (2013.01); *G02B 27/0149* (2013.01); *G06F 3/013* (2013.01); *B60K 2370/1529* (2019.05); *B60K 2370/741* (2019.05)

(58) Field of Classification Search
CPC ....... G06F 3/012; G06F 3/013; H04N 13/363; H04N 13/366; H04N 13/371–383; G02B 27/01; G02B 27/0101; G02B 27/0149; G02B 27/0176; G02B 27/0179; G02B 27/18; G02B 27/2228; G02B 2027/013; G02B 2027/0138; G02B 2027/014; G02B 2027/0154; G02B 2027/0159–0163; G02B 2027/0181–0187; G01S 17/66; G01S 17/88–894; B60K 35/00; B60K 37/00–06; B60K 2370/1529; B60K 2370/741

See application file for complete search history.

(56) References Cited

U.S. PATENT DOCUMENTS

| | | | | |
|---|---|---|---|---|
| 5,635,708 | A * | 6/1997 | Obata | ................ G02B 26/0833 235/462.45 |
| 2010/0067118 | A1* | 3/2010 | Takahashi | .............. G02B 27/01 359/633 |
| 2016/0349516 | A1* | 12/2016 | Alexander | ........... H04N 9/3129 |

* cited by examiner

*Primary Examiner* — Nathan Danielsen
(74) *Attorney, Agent, or Firm* — Lorenz & Kopf LLP

(57) ABSTRACT

In various embodiments, methods, systems, and vehicles are provided that include a head-up display and a locator system. In an exemplary embodiment, the head-up display system includes a housing; a light source disposed within the housing; and one or more mirrors disposed within the housing. Also in certain embodiments, the locator system includes: a galvanic mirror disposed outside, and in proximity to, the housing; a laser formed on the galvanic mirror; and a receiver formed on the galvanic mirror.

20 Claims, 3 Drawing Sheets

US 10,860,093 B1

EYE LOCATION TRACKING DEVICE INTEGRATED WITH HEAD-UP DISPLAY

TECHNICAL FIELD

The technical field generally relates to the field of vehicles (e.g., land-based vehicles, water-based vehicles, and aircraft) and, more specifically, to methods and systems for identifying a location of an eye of an individual in the vehicle.

BACKGROUND

Certain vehicles include a head-up display in for providing information to a driver of the vehicle. Such head-up displays may require a detected location of an eye of the driver, for example in order to display the information in a visible manner for the driver to see.

Accordingly, it is desirable to provide systems for locating an eye of a driver of a vehicle. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, a system is provided that includes a head-up display and a locator system. The head-up display system includes: a housing; a light source disposed within the housing; and one or more mirrors disposed within the housing. The locator system includes: a galvanic mirror disposed outside, and in proximity to, the housing; a laser formed on the galvanic mirror; and a receiver formed on the galvanic mirror.

Also in an embodiment, the galvanic mirror is disposed against an outer surface of the housing.

Also in an embodiment, the housing is disposed within a front dash of the vehicle.

Also in an embodiment, the galvanic mirror includes a single mirror made of a single, unitary piece.

Also in an embodiment, the laser and the receiver are both formed integral with the galvanic mirror.

Also in an embodiment, the laser is configured to transmit an infrared ray toward a face of an occupant of a vehicle; and the receiver is configured to receive a reflection of the infrared ray after the infrared ray has reflected off the face of the occupant.

Also in an embodiment, the receiver includes a single sensor that is configured to receive a single pixel at a time.

Also in an embodiment, the system further includes a lens formed within the receiver.

Also in an embodiment, the system further includes a computer system coupled to the locator system, the computer system including: a memory configured to store information as to reflections received by the receiver; and a processor coupled to the memory and configured to at least facilitate mapping the face of the occupant based on the stored information as to the reflections.

Also in an embodiment, the processor is further configured to at least facilitate rotating the galvanic mirror.

In another exemplary embodiment, a vehicle is provided that includes: (i) a body; (ii) a drive system configured to propel the body; (iii) a front dash formed in the body; (iv) a head-up display system including: (a) a housing formed in the front dash; (b) a light source disposed within the housing; and (c) one or more mirrors disposed within the housing; and (v) a locator system including: (a) a galvanic mirror disposed outside, and in proximity to, the housing; (b) a laser formed on the galvanic mirror; and (c) a receiver formed on the galvanic mirror.

Also in an embodiment, the galvanic mirror is disposed against an outer surface of the housing.

Also in an embodiment, the galvanic mirror includes a single mirror made of a single, unitary piece.

Also in an embodiment, the laser and the receiver are both formed integral with the galvanic mirror.

Also in an embodiment, the laser is configured to transmit an infrared ray toward a face of an occupant of a vehicle; and the receiver is configured to receive a reflection of the infrared ray after the infrared ray has reflected off the face of the occupant.

Also in an embodiment, the receiver includes a single sensor that is configured to receive a single pixel at a time.

Also in an embodiment, the locator system further includes a lens formed within the receiver.

Also in an embodiment, the vehicle further includes a computer system coupled to the locator system, the computer system including: (a) a memory configured to store information as to reflections received by the receiver; and (b) a processor coupled to the memory and configured to at least facilitate: (i) mapping the face of the occupant based on the stored information as to the reflections; and rotating the galvanic mirror.

In another embodiment, a method is provided that includes: transmitting, via a laser formed on a galvanic mirror outside a head-up display system of a vehicle, an infrared ray toward a face of an occupant of the vehicle; receiving, via a receiver formed on the galvanic mirror, a reflection of the infrared ray after the infrared ray has reflected off the face of the occupant; and storing information as to the reflection in a computer memory.

Also in an embodiment, the method further includes: rotating the laser, multiple times, via instructions provided by a processor; transmitting, via the laser, an additional infrared ray toward a face of an occupant of the vehicle after each rotation of the laser; receiving, via the receiver, additional reflections of the additional infrared rays after the additional infrared rays have reflected off the face of the occupant; storing the additional reflections in the computer memory; and mapping the face of the occupant, including a location of an eye of the occupant, via the processor, using the reflection and the additional reflections.

DESCRIPTION OF THE DRAWINGS

The present disclosure will hereinafter be described in conjunction with the following drawing figures, wherein like numerals denote like elements, and wherein.

Figure 2:
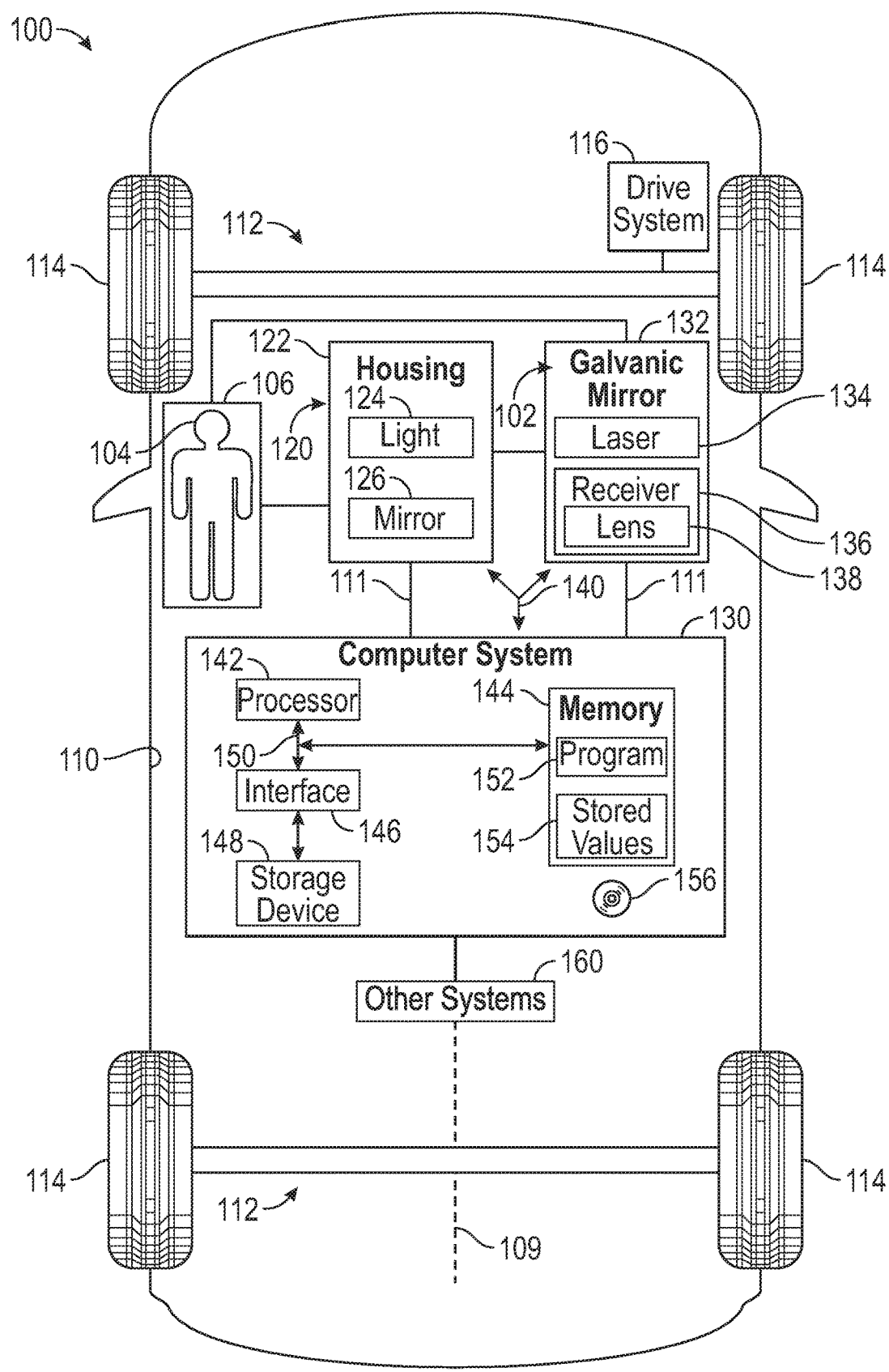
FIG. 2 is a functional block diagram of a vehicle that includes a locator system (e.g., as depicted in FIG. 1) for identification of a location of an eye of an occupant of the vehicle, depicted as integrated with a head-up display system and a computer system for the vehicle, in accordance with an exemplary embodiment.

1 and 2 and the vehicle and computer system of FIG. 2, in accordance with exemplary embodiments.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
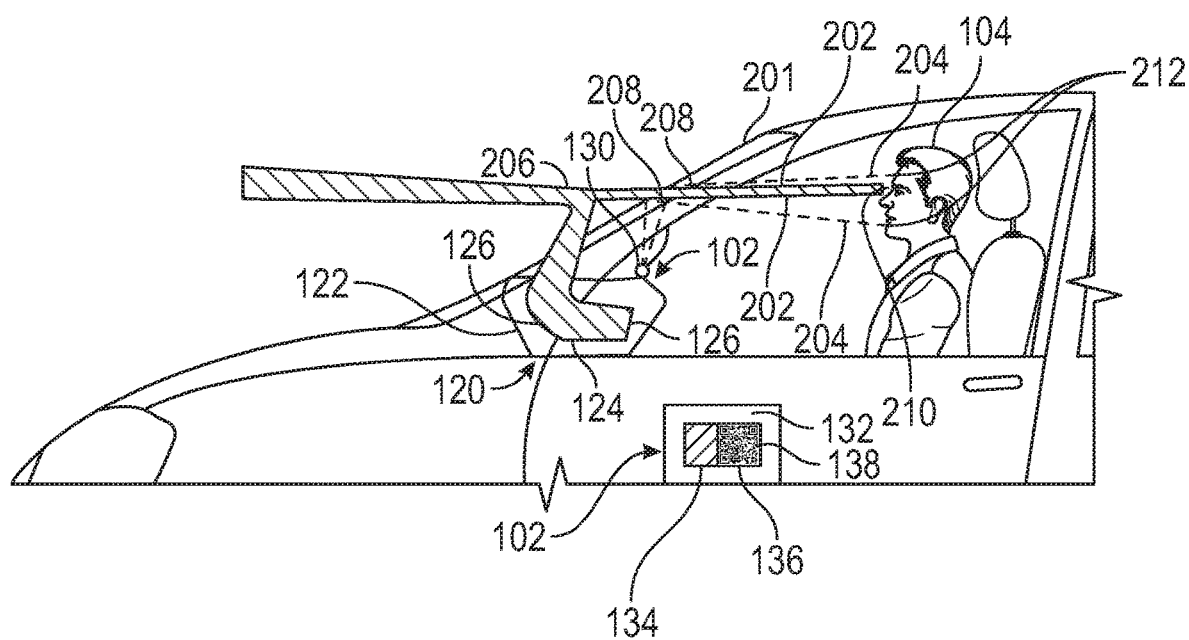
FIG. 1 is a schematic diagram that includes a portion of a locator system and head-up display system for a vehicle, and that can be utilized in connection with the vehicle of FIG. 2, in accordance with exemplary embodiments.

As shown in FIG. 1, in various embodiments, a head-up display system 120 for a vehicle is provided along with a locator system 102 for locating eyes of an occupant of the vehicle.

In various embodiments, the head-up display system 120 and locator system 102 may be implemented in connection with one or more vehicles, such as the vehicle 100 depicted in FIG. 2 and described below. In certain embodiments, the head-up display 120 and locator system 102 are implemented in a land-based vehicle, such as an automobile, truck, or other land-based vehicle (e.g., as depicted in FIG. 2 and described in greater detail further below in connection therewith). In certain other embodiments, the head-up display 120 and locator system 102 are implemented in a water-based vehicle, such as a boat, submarine, or other water-based vehicle. In yet other embodiments, the head-up display 120 is implemented in an aircraft (e.g., an airplane, helicopter, spacecraft, and/or other aircraft).

With continued reference to FIG. 1, in various embodiments, the head-up display system 120 includes a housing (or package) 122, a light source 124, and one or more internal mirrors 126. Also in various embodiments, the head-up display 120 operates with light rays emanating from the light source 124, reflecting off the internal mirrors 126, and then resulting in light rays 202 that reflect off a windshield 201 of the vehicle (e.g., at reflection point 206 as illustrated in FIG. 1) and toward an occupant of the vehicle (e.g., reaching the occupant at point 210 as illustrated in FIG. 1).

Also as shown in FIG. 1, in certain embodiments the locator system 102 is disposed against an outer surface of the housing (or package) 122 of the head-up display system 120. In various embodiments, the locator system 102 is configured for locating and/or identifying a location of an eye of an occupant (e.g., a driver) of the vehicle, for example, as described in greater detail below in connection with FIG. 2.

In certain embodiments, as depicted in FIG. 1, the locator system 102 is disposed directly against, and in contact with, the outer surface of the housing (or package) 122 of the head-up display system 120. In certain other embodiments, as depicted in FIG. 1, the locator system 102 is disposed outside, and in proximity to, the outer surface of the housing (or package) 122 of the head-up display system 120.

As depicted in FIG. 1, the locator system 102 operates with infrared rays 204 emanating from the laser 134, reflecting off the windshield 201 of the vehicle (e.g., at reflection points 208 as illustrated in FIG. 1) and toward the occupant (e.g., reaching the occupant at points 212 as illustrated in FIG. 1), and with the reflections then received via the receiver 136 of the locator system 102.

FIG. 2 illustrates a vehicle 100 in which the head-up display system 120 and the locator system 102 of FIG. 1 are implemented, according to an exemplary embodiment. As described in greater detail below, the locator system 102 is configured for locating and/or identifying a location of an eye of an occupant 104 of the vehicle 100. In various embodiments, the locator system 102 is configured to ascertain a location of the eye of a driver 104 sitting in a front seat 106 of the vehicle 100. Also in various embodiments, the locator system 102 is integrated with the head-up display system 120 and a computer system 130 for the vehicle 100, as depicted in FIG. 2 and described in greater detail further below. In certain embodiments, the locator system 102, the head-up display system 120, and the computer system 130 (and/or components thereof) may be collectively referred to as the control system 140, as depicted in FIG. 2.

In various embodiments, the vehicle 100 may comprise any number of different types of vehicles or mobile platforms. In certain embodiments, the vehicle 100 comprises a land-based vehicle, such as any one of a number of different types of automobiles, such as, for example, a sedan, a wagon, a truck, or a sport utility vehicle (SUV), motorcycle, and/or other land-based vehicles. In certain other embodiments, the vehicle 100 comprises a water-based vehicle, such as a boat, submarine, or other water-based vehicle. In yet other embodiments, the vehicle 100 comprises an aircraft (e.g., an airplane, helicopter, spacecraft, and/or other aircraft).

In the depicted exemplary embodiment, the vehicle 100 includes the above-referenced body 110 that is arranged on a chassis 109. The body 110 substantially encloses other components of the vehicle 100. The body 110 and the chassis 109 may jointly form a frame. The vehicle 100 also includes a plurality of axles 112 and wheels 114. The wheels 114 are each rotationally coupled to one or more of the axles 112 near a respective corner of the body 110 to facilitate movement of the vehicle 100. In one embodiment, the vehicle 100 includes four wheels 114, although this may vary in other embodiments (for example for trucks and certain other vehicles).

Also in the depicted exemplary embodiment, a drive system 116 is mounted on the chassis 109, and drives the wheels 114. The drive system 116 preferably comprises a propulsion system. In certain exemplary embodiments, the drive system 116 comprises an internal combustion engine and/or an electric motor/generator, coupled with a transmission thereof. In certain embodiments, the drive system 116 may vary, and/or two or more drive systems 116 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 2 (and as noted above), in various embodiments the locator system 102 includes a galvanic mirror 132, a laser 134, and a receiver 136. In various embodiments, the galvanic mirror 132 comprises a single mirror made of a single, unitary piece. Also in various embodiments, the laser 134 and receiver 136 are formed on, and are integrated with, the galvanic mirror. In certain embodiments, as described below, the locator system 102 is attached to and/or formed outside a housing 122 of the head-up display system 120.

In various embodiments, the laser 134 comprises an infrared (IR) laser configured to send infrared rays against a face of the occupant 104 (e.g., a driver) of the vehicle 100, one point at a time. Also in various embodiments, the receiver 136 is configured to receive the reflections of the infrared rays after they contact the face of the occupant 104. In one embodiment, the receiver 136 comprises a single sensor that is configured to receive a single pixel at a time.

In addition, in certain embodiments, a lens 138 is included on the receiver 136, which may for example improve the signal to noise ratio.

In certain embodiments, the receiver 136 is configured to receive different reflections of the infrared rays, one at a time, as they reflect off the face of the occupant 104. In various embodiments, the galvanic mirror rotates the laser 134 and receiver 136 at various points in time, so that each infrared ray (and reflection thereof) correspond to a different point location on the face of the occupant 104. Accordingly, in this manner, the face of the occupant 104 can be effectively scanned one pixel at a time, corresponding to one point location at a time on the face of the occupant.

In various embodiments, the locator system 102 may be utilized, in conjunction with the computer system 130 described below, in performing a method for identifying a location of an eye of the occupant 104 of the vehicle 100, in accordance with the steps of the control process 300 depicted in FIG. 3 and described further below in connection therewith.

In various embodiments, the head-up display system 120 includes the above-referenced housing (or package) 122, light source 124, and one or more internal mirrors 126. In certain embodiments, the head-up display system 120 (including the housing 122 thereof) is built into a front dash of the vehicle 100, in front of the front seat 106. In various embodiments, the locator system 102 is integrated with the head-up display system 120.

In various embodiments, the computer system 130 is coupled to the locator system 102, and in certain embodiments is coupled also to the head-up display system 120 and one more other vehicle systems 160. In various embodiments, the computer system 130 receives information as to the pixel reflections received by the receiver 136, stores the information, and processes the information for mapping the face (including the eyes) of the occupant 104. In certain embodiments, the computer system 130 also controls rotation of the locator system 102 for mapping the face of the occupant 104. In addition, in certain embodiments, the computer system 130 identifies the location of the eye of the driver 104 of the vehicle 100 using the mapping of the face, and takes appropriate actions pertaining thereto (e.g., adjusting the locator system 102 and/or head-up display 120 as appropriate, and/or taking control of one or more of the other vehicle systems 160, such as braking or steering, as appropriate based on the location of the eye and whether the occupant is keeping an eye on the road, and so on). Also as depicted in FIG. 2, in various embodiments the computer system 104 is coupled to the locator system 102 and/or the head-up display system 120 via one or more communication links 111 (e.g., to receive the pixel information from the receiver 136, and so on). In certain embodiments, the communication link 111 comprises one or more wired connections, such as one or more cables (e.g. coaxial cables and/or one or more other types of cables), and/or one or more wireless connections (e.g. using wireless bus technology). In various embodiments, the computer system 130 performs these functions in accordance with the process 300 described further below in connection with FIG. 3.

In the depicted embodiment, the computer system 130 includes a processor 142, a memory 144, an interface 146, a storage device 148, and a bus 150. The processor 142 performs the computation and control functions of the computer system 130, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the computer system 130 and the computer system of the computer system 130, generally in executing the processes described herein, such as the process 300 described further below in connection with FIG. 3.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with one or more stored values 154 (e.g., including the pixel information received from the receiver 136).

The bus 150 serves to transmit programs, data, status and other information or signals between the various components of the computer system of the computer system 130. The interface 146 allows communication to the computer system of the computer system 130, for example from a system driver and/or another computer system, and can be implemented using any suitable method and apparatus. In one embodiment, the interface 146 obtains the pixel data from the receiver 136. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including direct access storage devices such as hard disk drives, flash systems, floppy disk drives and optical disk drives. In one exemplary embodiment, the storage device 148 comprises a program product from which memory 144 can receive a program 152 that executes one or more embodiments of one or more processes of the present disclosure, such as the steps of the process 200 (and any sub-processes thereof) described further below in connection with FIG. 3. In another exemplary embodiment, the program product may be directly stored in and/or otherwise accessed by the memory 144 and/or a disk (e.g., disk 156), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the computer system 130 may also otherwise differ from the embodiment depicted in FIG. 2, for example in that the computer system of the computer system 130 may be coupled to or may otherwise utilize one or more remote computer systems and/or other locator systems.

Figure 3:
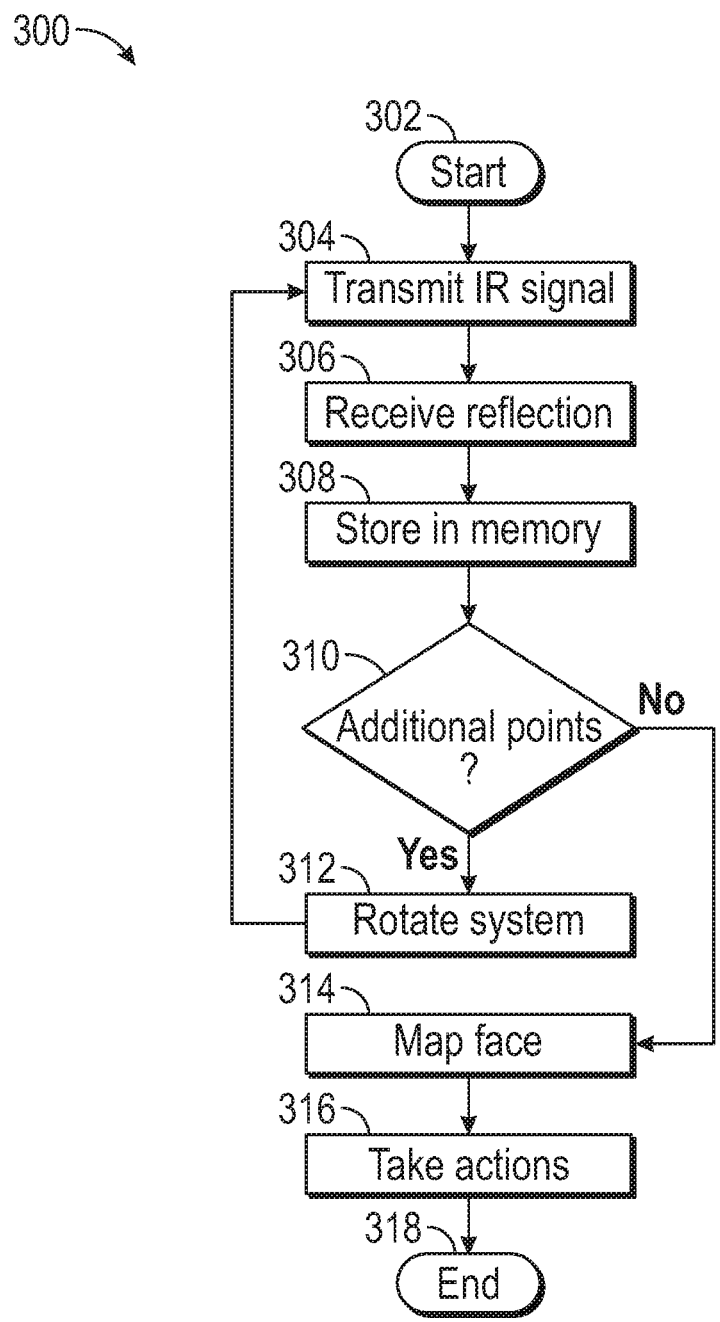
FIG. 3 is a flowchart of a process for identifying a location of an eye of an occupant of a vehicle, and that can be implemented in connection with the locator system of FIGS.

FIG. 3 is a flowchart of a process 300 for mapping a face of an occupant of a vehicle, in accordance with an exemplary embodiment. The process 300 of FIG. 3 can be implemented in connection with the vehicle 100, including the locator system 102, head-up display system 120, and computer system 130 thereof, of FIGS. 1 and 2, in accordance with an exemplary embodiment.

As depicted in FIG. 3, the process begins at step 302. In one embodiment, the process 300 begins when a vehicle drive or ignition cycle begins, for example when a driver turns on the vehicle and/or an ignition therefor (e.g. by turning a key, engaging a keyfob or start button, and so on). In another embodiment, the process 300 begins when the locator system 102 is activated. In one embodiment, the steps of the process 300 are performed continuously during operation of the vehicle.

Infrared signals are transmitted at step 304. In various embodiments, the laser 134 transmits infrared rays (or signals) against a windshield 201 of the vehicle 100 and toward the occupant 104 (e.g., driver) of the vehicle 100, for example as depicted in FIG. 1 and described above in connection therewith. In various embodiments, the laser 134 transmits a single infrared ray during each single iteration of step 304, toward a single point of the face of the occupant 104.

The infrared signals are received at step 306. In various embodiments, the infrared signals (or rays) are received by the receiver 136 after being reflected off a single point of the face of the occupant 104, for example as depicted in FIG. 1 and described above in connection therewith. In various embodiments, the receiver 136 receives a single reflected infrared signal, with a single pixel, during each single iteration of step 306.

Information as to the received signal is stored in memory at 308. In various embodiments, information as to the single received pixel is stored in the memory 144 (as a stored value 154 thereof) during each single iteration of step 308.

In various embodiments, a determination is made at step 310 as to whether any additional points on the face of the user 104 are to be examined for the mapping of the face. In various embodiments, this determination is made by the processor 142 of FIG. 2 as to whether the mapping of the face of the occupant 104 is not complete (e.g., as whether a sufficient number of point locations on the face have not yet been examined).

If it is determined that additional appoints on the face are to be examined, then the locator system 102 is rotated at step 312. Specifically, in various embodiments, the processor 142 provides instructions for the rotation of the galvanic mirror 132 of FIG. 1, to thereby cause rotation of the laser 134 and the receiver 136, to thereby aim the laser 134 toward a different point location of the face of the occupant 104 that has not yet been examined. Steps 304-312 thereafter repeat in various new iteration (each corresponding to a different point location of the face of the occupant 104), until a determination is made in an iteration of step 310 that there are no additional point locations to be examined on the face of the occupant 104.

Once a determination is made in an iteration of step 310 that there are no additional point locations to be examined on the face of the occupant 104, the process then proceeds to step 314. During step 314, the face (or a component of the face, such as one or more eyes) of the occupant 104 is mapped. In various embodiments, the processor 142 of FIG. 2 maps the face (or one or more eyes thereof) by compiling the different pixels stored in the memory 144 during various iterations of step 308. Also in various embodiments, the mapping includes a location of the one or more eyes.

In addition, in certain embodiments, a vehicle control action is taken at step 316, based on the mapping of the face (e.g., the location of the eyes) of the occupant. For example, in certain embodiments, the processor 142 may control the head-up display unit 120, including an angle thereof, based on the mapping (e.g., the eye locations). In addition, in certain embodiments, the processor 142 may adjust the rotation of the locator system 102 based on the mapping (e.g., the eye locations). Finally, in certain embodiments, the processor 142 may also provide instructions for a warning or alert, or for the taking of automatic control over more of the other systems 160 (such as braking, steering, or the like) as necessary based on the mapping (e.g., the eye locations), for example if the driver 104 appears to be closing his or her eyes and/or not paying attention to the road.

In various embodiments, the process ends at 318 (e.g., in certain embodiments, at the end of a current vehicle drive or ignition cycle).

Accordingly, the disclosed methods, systems, and vehicles provide for systems and methods for mapping a face of an occupant of the vehicle, including locations of the eyes of the occupant. In various embodiments, a locator system includes a laser and a receiver integrated with a galvanic mirror for mapping the face, with the locator system being disposed outside (and, in certain embodiments, directly against an outer surface of) a housing for a head-up display system for the vehicle.

It will be appreciated that the systems, vehicles, and methods may vary from those depicted in the Figures and described herein. For example, the vehicle 100, the locator system 102, the head-up display system 120, the computer system 130, and/or various components thereof may vary from that depicted in FIGS. 1 and 2 and described in connection therewith, in various embodiments. It will similarly be appreciated that the steps and/or implementations of the process 300 may differ from those depicted in FIG. 3, and/or that various steps of the process 300 may occur concurrently and/or in a different order than that depicted in FIG. 3, in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for a vehicle comprising:
a head-up display system disposed within the vehicle and comprising:
a housing;
a light source disposed within the housing; and
one or more mirrors disposed within the housing; and
a locator system disposed within the vehicle and comprising:
a galvanic mirror disposed outside, and against, the housing;
a laser formed on the galvanic mirror and configured to send infrared rays against a face of an occupant of the vehicle; and
a receiver formed on the galvanic mirror and configured to receive the reflections of the infrared rays after they contact the face of the occupant of the vehicle.

2. The system of claim 1, wherein the galvanic mirror is disposed against an outer surface of the housing.

3. The system of claim 1, wherein the housing is disposed within a front dash of the vehicle.

4. The system of claim 1, wherein the galvanic mirror comprises a single mirror made of a single, unitary piece.

5. The system of claim 1, wherein the laser and the receiver are both formed integral with the galvanic mirror.

6. The system of claim 1, wherein:
the laser is configured to transmit an infrared ray first toward a windshield of the vehicle and subsequently, from the windshield, toward the face of the occupant of the vehicle; and
the receiver is configured to receive a reflection of the infrared ray after the infrared ray has reflected off the face of the occupant.

7. The system of claim 1, wherein:
the laser is configured to transmit the infrared ray, one point at a time, toward the windshield of the vehicle and subsequently, from the windshield, toward the face of the occupant of the vehicle; and
the receiver comprises a single sensor that is configured to receive a single pixel at a time after reflection off the face of the occupant.

8. The system of claim 1, further comprising:
a lens formed within the receiver.

9. The system of claim 7, further comprising:
a computer system coupled to the locator system, the computer system comprising:
a memory configured to store information as to reflections received by the receiver; and
a processor coupled to the memory and configured to at least facilitate mapping the face of the occupant based on the stored information as to the reflections.

10. The system of claim 9, wherein the processor is further configured to at least facilitate rotating the galvanic mirror, and wherein the rotation of the galvanic mirror via the processor in turn rotates the laser and the receiver at various points in time, so that each infrared ray, and reflection thereof, corresponds to a different point on the face of the occupant, such that the face of the occupant is effectively scanned one pixel at a time, corresponding to one point location at a time on the face of the occupant.

11. A vehicle comprising:
a body;
a drive system configured to propel the body;
a front dash formed in the body;
a head-up display system disposed within the vehicle and comprising:
a housing formed in the front dash;
a light source disposed within the housing; and
one or more mirrors disposed within the housing; and
a locator system disposed within the vehicle and comprising:
a galvanic mirror disposed outside, and against, the housing;
a laser formed on the galvanic mirror and configured to send infrared rays against a face of an occupant of the vehicle; and
a receiver formed on the galvanic mirror and configured to receive the reflections of the infrared rays after they contact the face of the occupant of the vehicle.

12. The vehicle of claim 11, wherein the galvanic mirror is disposed against an outer surface of the housing.

13. The vehicle of claim 11, wherein the galvanic mirror comprises a single mirror made of a single, unitary piece.

14. The vehicle of claim 11, wherein the laser and the receiver are both formed integral with the galvanic mirror.

15. The vehicle of claim 11, wherein:
the laser is configured to transmit an infrared ray first toward a windshield of the vehicle and subsequently, from the windshield, toward the face of the occupant of the vehicle; and
the receiver is configured to receive a reflection of the infrared ray after the infrared ray has reflected off the face of the occupant.

16. The vehicle of claim 11, wherein:
the laser is configured to transmit the infrared ray, one point at a time, toward the windshield of the vehicle and subsequently, from the windshield, toward the face of the occupant of the vehicle; and
the receiver comprises a single sensor that is configured to receive a single pixel at a time after reflection off the face of the occupant.

17. The vehicle of claim 11, wherein the locator system further comprises a lens formed within the receiver.

18. The vehicle of claim 16, further comprising a computer system coupled to the locator system, the computer system comprising:
a memory configured to store information as to reflections received by the receiver; and
a processor coupled to the memory and configured to at least facilitate:
mapping the face of the occupant based on the stored information as to the reflections; and
rotating the galvanic mirror, wherein the rotation of the galvanic mirror via the processor in turn rotates the laser and the receiver at various points in time, so that each infrared ray, and reflection thereof, corresponds to a different point on the face of the occupant, such that the face of the occupant is effectively scanned one pixel at a time, corresponding to one point location at a time on the face of the occupant.

19. A method comprising:
transmitting, via a laser formed on a galvanic mirror outside a head-up display system of a vehicle and that is disposed inside the vehicle, an infrared ray toward a face of an occupant of the vehicle;
receiving, via a receiver formed on the galvanic mirror, a reflection of the infrared ray after the infrared ray has reflected off the face of the occupant; and
storing information as to the reflection in a computer memory that is part of a vehicle computer system that is disposed inside the vehicle.

20. The method of claim 19, further comprising:
rotating the laser, multiple times, via rotation of the galvanic mirror via instructions provided by a processor, wherein the rotation of the galvanic mirror via the processor in turn rotates the laser and the receiver at various points in time, so that each infrared ray, and reflection thereof, corresponds to a different point on the face of the occupant, such that the face of the occupant is effectively scanned one pixel at a time, corresponding to one point location at a time on the face of the occupant;
transmitting, via the laser, an additional infrared ray toward a face of an occupant of the vehicle after each rotation of the laser;
receiving, via the receiver, additional reflections of the additional infrared rays after the additional infrared rays have reflected off the face of the occupant;
storing the additional reflections in the computer memory; and
mapping the face of the occupant, including a location of an eye of the occupant, via the processor, using the reflection and the additional reflections.

\* \* \* \* \*